FIG. 1

| | C0 | C1 | C2 | C3----------C82 | C83 |
|---|---|---|---|---|---|
| SOM | MCU ADDRESS | HB ADDRESS OR POLL CODE | DEVICE OR BROADCAST CODE | TEXT | EOM |

FIG. 3

INVENTOR.
PATRICK E. RYAN
BY
ATTORNEY

United States Patent Office 3,564,499
Patented Feb. 16, 1971

3,564,499
MESSAGE TRANSMITTING SYSTEM
Patrick Edward Ryan, Stamford, Conn., assignor to The Bunker-Ramo Corporation, Canoga Park, Calif., a corporation of Delaware
Filed Jan. 25, 1968, Ser. No. 700,409
Int. Cl. H04q 9/00
U.S. Cl. 340—147
14 Claims

ABSTRACT OF THE DISCLOSURE

A system for transmitting messages from a central station to any selected one, or any selected combination, of remote devices while requiring that the central station transmit the message only a single time. A control unit is provided which unit has a memory with segments corresponding to each of the devices. Each message contains a destination code. The messages are applied by the central station to the control unit where the destination code is decoded and the message stored in the segments of the control unit memory corresponding to the device or devices for which the message is intended. The message in each segment of the control unit memory is subsequently transmitted to its associated device.

MESSAGE TRANSMITTING SYSTEM

This invention relates to a system for transmitting messages from a central station to a plurality of remote devices and more particularly to a system which permits a message to be transmitted to any selected one, or any selected combination, of said remote devices while requiring that the central station transmit the message only a single time.

Many systems require that a central station, such as a data processor, be able to send messages to a plurality of remotely positioned devices. In these systems the message generally contains a destination code identifying the particular remote device which is to receive the message. When the desired device has received the message, it either transmits a reply to the central station indicating that it has received the message or, in the alternative, the central station sends out a polling message to ascertain whether the previously sent information message has been properly received. This means that at least two, and possibly three, messages must be transmitted over the transmission lines interconnecting the central station and the remote station for each information message conveyed.

As long as each message from the central station is intended for only a single remote station, no improvement in this situation can be achieved. However, where there are a number of remote devices and where each message may be intended for several of these remote devices, it is apparent that more efficient utilization of the lines could be achieved if the messages could be sent to all the desired remote devices with a single transmission. In order for a system of this type to be practical, it must be flexible enough to permit each message from the central station to be sent to almost any desired combination of remote devices.

It is therefore a primary object of this invention to provide an improved system for transmitting messages from a central station to a plurality of remote devices.

A more specific object of this invention is to provide a message transmitting system which permits messages from the central station to be sent to a plurality of the remote devices while requiring only a single transmission of the message.

Another object of this invention is to provide a system of the type described above which is flexible enough to permit a given message to be sent to almost any desired combination of the remote devices.

In accordance with these objects this invention provides a central station such as a data processor which is adapted to generate messages and a plurality of message receiving remote devices. The processor includes, with each message, an indication of the remote device or devices which the message is to be routed to. Each message is applied to, and stored in, a control unit. The control unit includes means responsive to the destination indication in each message for selecting the particular device or devices which the message is to be routed to. The control unit also includes means for transmitting the message which is stored in the control unit to all of the selected devices.

When the number of the devices is greater than can be serviced by a single control unit, a plurality of control units may be provided each of which has a plurality of remote devices operatively associated therewith. Each message would then include an indication of the control unit for which the message is intended and each control unit would include a means responsive to the indication in a message for storing at the control unit only messages which are intended for it. A particular control unit code could be provided which would be accepted by all of the control units.

The foregoing and other objects, features and advantages of the invention will be apparent from the following more particular description of a preferred embodiment of the invention as illustrated in the accompanying drawings.

In the drawings:

FIG. 2 is a diagram illustrating how FIGS. 2A–2H are combined to form a more detailed block diagram of a portion of the system shown in FIG. 1.

Figure 1:
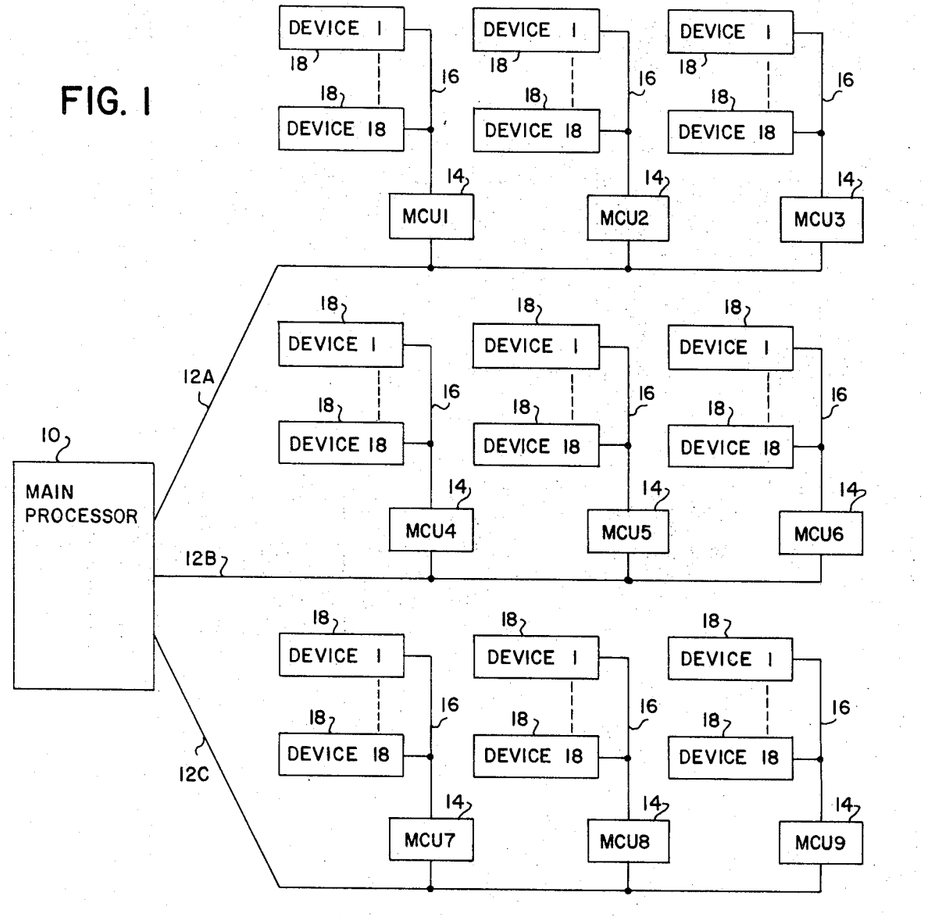
FIG. 1 is a block diagram of a system which is an illustrative embodiment of the invention.
Figure 2A:
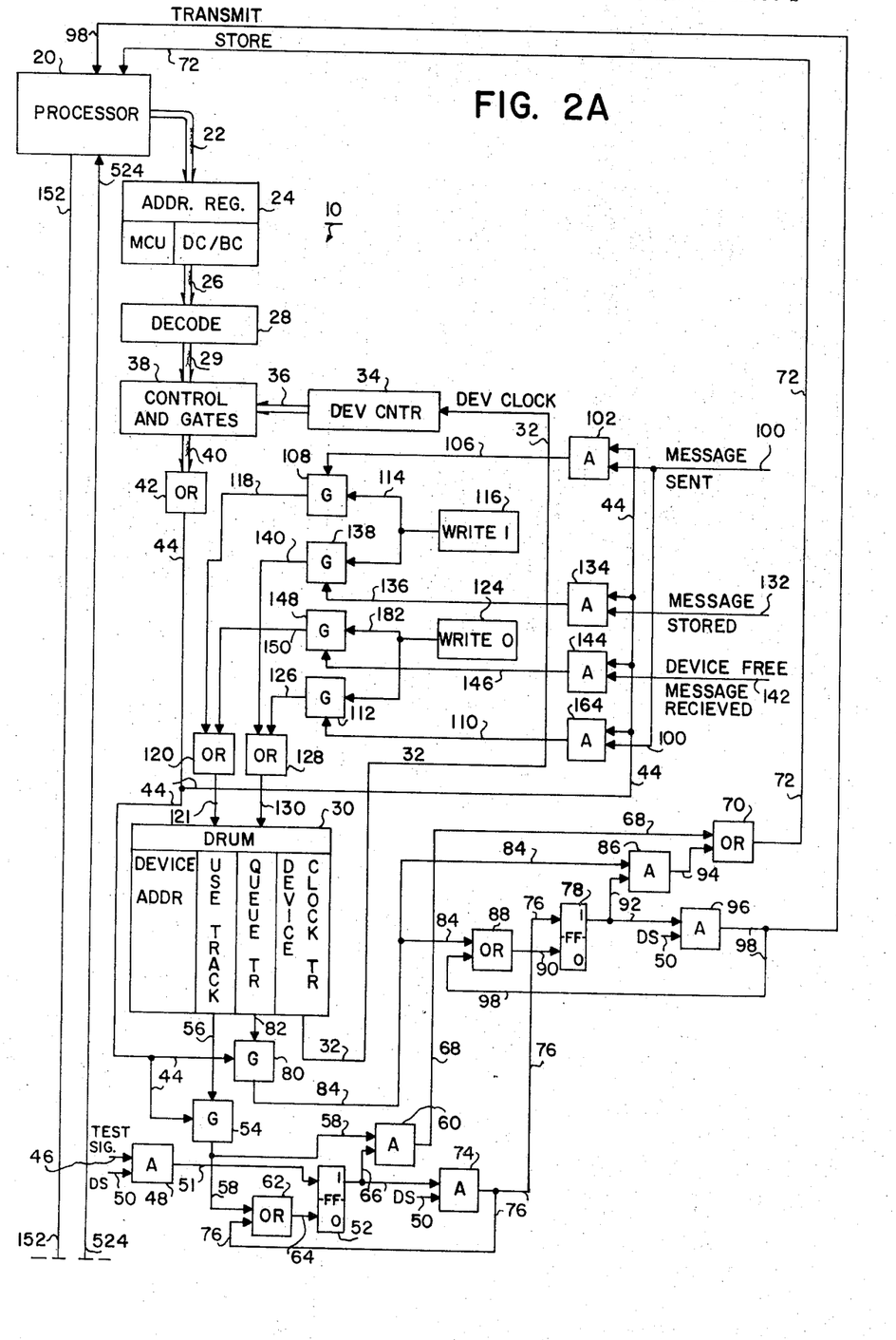
FIGS. 2A–2H when combined form a more detailed block diagram of a portion of the system shown in FIG. 1.

Referring now to FIG. 1, it is seen that the system includes a main processor 10 which may be a general purpose computer programmed to perform the required functions or a special purpose computer. In FIG. 2A special purpose circuitry has been shown for performing some of the functions required of the processor 10. Three high speed lines 12A–12C are utilized to transfer messages between processor 10 and a plurality of message control units (MCU's). While in FIG. 1, three MCU's have been shown as being connected to each line 12, the actual number of control units 14 connected to each line 12 is a matter of choice and will depend on a number of factors including the relative locations of the control units and the amount of message traffic on the line. Each message control unit 14 is connected through one or more lines 16 to apply messages to, and in some instances to receive messages from, a plurality of remote message receiving devices 18. In FIG. 1, eighteen devices have been shown as being serviced by each control unit 14. However, the actual number of devices services by each control unit would depend on a number of factors including the location of the devices and the memory capacity of the control unit. The manner in which the size of the control unit influences the number of remote devices which it may service will be seen from a later discussion in conjunction with FIGS. 2A–2H. A device 18 may be a receive-only device such as a printer or a CRT visual display device or may be a send and receive device which includes, in addition to the printer or display, a keyboard or other data entry device.

In operation, the main processor 10 would normally be situated at the main office of the system user, with the MCU's 14 being situated in various cities or areas of the country where the user desires to place devices. Each device 18 would be in an office or the like of the user in the areas serviced by its corresponding MCU.

Information messages in the system would generally be of two types, those originated by the processor 10 and those generated by the processor 10 in response to queries from a device 18. A third type of message generated by the processor is a polling message which contains no information, but is utilized to derive queries or other information from the MCU's. If a message generated by the processor 10 relates to a purely local matter, such as the fact that a customer is arriving in a particular office on a particular day, the processor could address the message to the particular device. Assume for example that a message is to be sent to device 1 of MCU1. A message would then be sent through line 12A which message would contain, as a first character thereof, the MCU1 code. When MCU1 recognizes its code, it stores the message. The stored message contains the device code for device 1 of MCU1 and the MCU operates in response to this device code to transmit the message to device 1. The manner in which the MCU performs this function will be described in some detail later.

There are, however, some messages which are of interest to a large number of devices. For example, assume that the system is being used in the stock brokerage community and that the devices 18 are situated in various stock broker's offices. A message relating to commodities would be of interest only to the ones of these offices dealing in commodities. Assume first that only MCU1 and MCU5 service offices dealing in commodities. In this event a message with the MCU1 code would be sent over line 12A and the same message with the MCU5 code would be sent over line 12B. Each of these messages would contain what will be referred to as a "broadcast code" which indicates that the message is a commodity message and should therefore be transmitted to all offices dealing in commodities. As will be described in more detail later, a decoder is provided at each MCU which recognizes the various broadcast codes which may appear, and, in response to these broadcast codes, selects the devices serviced by the MCU which are to receive the message. The MCU then transmits the message which it has received to each of the devices which is to receive messages of the type indicated by the broadcast code. For example, devices 1, 5 and 18 associated with MCU1 might receive the commodity message while devices 2, 4 and 10 associated with MCU5 might also receive this message. The particular devices which receive any given broadcast message is determined soley by the coding at the individual MCU's and may be varied by modifying the coding connections at the control unit.

If both MCU1 and MCU2 had commodity trading offices associated therewith, one of two procedures could be adopted. Either the message could be sent over line 12A a first time with the MCU1 code and then retransmitted with the MCU2 code, resulting in two transmissions of the same message, or, the message could be transmitted over line 12A with a universal MCU code which would cause the message to be stored in MCU1, MCU2 and MCU3. If the latter procedure is adopted, the broadcast code in the message could be decoded in MCU1 and MCU2 to cause the message to be transmitted to appropriate devices associated therewith. However, the commodity broadcast code in MCU3 would be decoded as not being meant for any of the devices and would therefore not be transmitted. The advantage of the latter procedure is that it would require only a single transmission of the message rather than two separate transmissions. Even if the former procedure is utilized, the number of message transmissions would be reduced from at least six (assuming an average of at least three commodity devices associated with each MCU) to only two.

Processor 10 also sends polling messages through the lines 12 to MCU's 14. As will be seen shortly, polling messages accomplish at least three functions. First, a polling message interrogates an MCU to verify that a previously transmitted message has been reecived properly. It is therefore apparent that the system not only reduces the number of information messages which are required over the lines 12, but also results in a like reduction in the number of polling messages required. A polling message also interrogates the MCU to determine if there are any queries from devices having an input capability for which responses will be required. Finally, since the lines 16 are low speed lines, the time required to transfer a message stored in the MCU to a device is substantially greater than the time required to load messages into the MCU's. Rolling messages are therefore utiilzed to interrogate the MCU's to determine when the transfer of a message from the MCU to its associated devices has been completed so that a new message for the device may be transmitted. On receiving a reply to a polling message, processor 10 will update its memory to reflect the condition of the devices and, if a query is received, will interrogate its memory to generate an answer and transmit the answer to the requesting device. The manner in which this latter function is accomplished does not form part of the present invention.

Before applying a message to a line 12, processor 10 interrogates its memory to determine if all devices which are to receive the message are available to receive messages, or, in other words, whether the transfer of information between the associated MCU and all devices which are to receive the message have been completed. If one of the devices which is to receive the message has not finished receiving a previous message, the sending of the present message is inhibited. Before a message to a given device is transmitted, the processor also interrogates its memory to determine if there is another message waiting to be sent to the same device. The transmitting of a message is also inhibited if there is another message waiting to be transmitted to the same device.

FIGS. 2A–2H show, in more detail, one message control unit (MCU) 14 and a portion of main processor 10. Referring first to FIG. 2A, it is seen that main processor 10 includes, as a major part thereof, a programable processor 20. The specifics of how processor 20 performs its functions do not form part of the present invention and therefore will not be gone into in detail. However, where appropriate, circuitry capable of performing certain of the required functions of processor 20 will be briefly described. When processor 20 has a message to be transmitted it applies the MCU and device or broadcast code for the message through lines 22 to be stored in address register 24. As indicated previously, a message may be intended for a particular one of the devices 18 in which event only the code for the particular device would be stored in register 24. However, if the message is intended for a number of the devices 18, such as would, for example, be the case for a commodity message, a broadcast code indicating that the message is a commodity-type message would be stored in register 24. The address in registor 24 is applied in parallel through lines 26 to decoder 28. For a system of the type shown in FIG. 1, with nine MCU's and eighteen devices connected to each MCU, there would be 168 output lines 29 from decoder 28. Stated another way, there is an output line 29 from decoder 28 for each device in the system. If there is a device code in register 24, there will be an output on only one of the lines 29. However, if there is a broadcast code in register 24, output signals will appear on many of the lines 29.

Main processor 10 also contains a memory which, for the purpose of the present discussion, will be assumed to be a rotating magnetic drum 30. Drum 30 has been shown as having a device address stored on one or more tracks thereof. The storage of these addresses is, however, optional, and may be dispensed with. Drum 30 also has a use track which contains a bit if the associated device is presently having a message transferred into it from the associated MCU, a queue-track which has a bit stored in it if the associated device has a message waiting in processor 20 to be sent to it, and a device-clock track which has a bit in it for each device position on the drum. The device clock bits are read out and applied through line 32 to increment device counter 34. Device counter 34 therefore always indicates the device for which information is currently being read or written on drum 30. The device count in counter 34 is applied through lines 36 as one set of inputs to control AND gate 38. The other set of inputs to these AND gates are decoder output lines 29. One of the control AND gates 38 generates an output signal when there is a signal on the output line 29 from decoder 28 corresponding to the device indicated by device counter 34. In other words, there is an output signal on a line 40 from a control AND gate 38 when the drum is positioned to read or write information relating to a device which processor 20 wishes to send a message to. Signals on lines 40 are applied through OR gate 42 to line 44.

When processor 20 applies an address to register 24 it also applies a signal through line 46 to ONE input of AND gate 48. The other input to AND gate 48 is data sync line 50 from drum 30. A signal appears on line 50 once per revolution of drum 30 and would generally result from a once-per-revolution bit stored on a clock track of the drum. Therefore, the first time that a signal appears on line 50 after a test signal is applied to line 46 AND gate 48 is fully conditioned to generate an output signal on line 51 which is applied to switch flip-flop 52 to its ONE state. The duration of the signal on line 46 is equal to the time required for drum 30 to complete a revolution. Therefore, there will be only a single output on line 51 for a given test signal on line 46.

A signal on line 44 is applied as the conditioning input to gate 54 is output line 56 from the use track of drum 30. Gate 54 is therefore effective to sample whether a device which it is desired to send a message to is available to receive a message. Output line 58 from gate 54 is applied as one input to AND gate 60 and through OR gate 62 and line 64 to the ZERO-side input of flip-flop 52. The second input to AND gate 60 is ONE-side output line 66 from flip-flop 52. A signal on output line 68 from AND gate 60 is applied through OR gate 70 and line 72 to processor 20. A signal on line 72 is interpreted by processor 20 as an indication that the message which the processor wishes to transmit cannot be transmitted at the particular time and should be stored.

Output line 66 from the ONE-side of flip-flop 52 is also applied as ONE input to AND gate 74. The other input to AND gate 74 is data sync line 50. Therefore, if after a complete revolution of drum 30, gate 54 has not generated an output indicating that a device which it is desired to send the message to is in use, AND gate 74 is fully conditioned to generate an output signal on line 76 which signal is applied to set flip-flop 78 to its ONE state and is also applied through OR gate 62 and line 64 to reset flip-flop 52 to its ZERO state.

Line 44 is also applied as the conditioning input to gate 80. The information input to gate 80 is output line 82 from the queue-track of drum 30. Gate 80 is therefore effective to sample whether there is a message waiting in processor 20 to be sent to a device which the message presently being investigated is intended for. Output line 84 from gate 80 is applied as one input to AND gate 86 and through OR gate 88 and line 90 to the ZERO side input of flip-flop 78. The second input to AND gate 86 is output line 92 from the ONE side of flip-flop 78. AND gate 86 is therefore fully conditioned to generate an output signal on line 94 if, during the scan of drum 30 while flip-flop 78 is in its ONE state, it is found that there is a message stored in processor 20 which is intended for a device which is the same as a device for which the message being investigated is intended. A signal on line 94 is applied through OR gate 70 and line 72 to inform processor 20 that the message being investigated is to be stored rather than transmitted.

Output line 92 from the ONE-side of flip-flop 78 is also connected as ONE input to AND gate 96. The other input to AND gate 96 is data sync line 50. Therefore, if after one revolution of drum 30, flip-flop 78 is still in its ONE state, indicating that there are no messages waiting in processor 20 to be sent to a device which is the same as a device for which the message being investigated is intended, AND gate 96 is fully conditioned to generate an output signal on line 98 which signal is applied through OR gate 88 and line 90 to reset flip-flop 78 and is also applied as an input to processor 20. The signal on line 98 is interpreted by processor 20 as a go-ahead to transmit the message being investigated.

Referring still to FIG. 2A, it is seen that when processor 20 transmits a message, a signal is applied through line 109 to ONE input of AND gates 102 and 104. The signal on line 100 may, for example, be generated by setting a flip-flop in processor 20 in response to the reception of a signal on transmit line 98. The address in address register 24 remains unchanged. The second input to AND gates 102 and 104 is the before mentioned line 44. AND gates 102 and 104 are therefore fully conditioned each time information corresponding to a device for which the message transmitted is intended is in a position to be written into. Output line 106 from AND gate 102 is connected as a conditioning input to gate 108 while output line 110 from AND gate 104 is connected as the conditioning input to gate 112. The information input to gate 108 is output line 114 from write-one generator 116. Therefore, when gate 108 is conditioned, a signal of proper amplitude and duration to cause a bit to be recorded on drum 30 is applied through gate 108, line 118, OR gate 120, and line 121 to be written into the use track of drum 30. The information input to gate 112 is output line 122 from write-zero generator 124. Therefore, when gate 112 is conditioned, a signal of appropriate magnitude and duration to erase a bit recorded on drum 30 is applied through gate 112, line 126, OR gate 128 and line 130 to be recorded on the queue-track of drum 30. Therefore, when a message is sent, a bit is recorded in the use track for each device for which the message is intended and the bit in the queue-track for the device is erased. Since it is possible that there may be more than one message waiting in processor 20 to be sent to a given device, it is necessary, after as message is sent, to attempt to send the various messages in the queue in processor 20, in the order in which they are stored. If it is decided that a message must again be stored, this will, as will be seen shortly, cause an appropriate bit to be stored in the queue-track of drum 30.

When a message is stored in processor 20, the processor applies a signal through line 132 to one input of AND gate 134. This signal may be generated by setting a flip-flop in processor 20 when a store signal is received on line 72. As with a message which is transmitted, the address in address register 24 remains the same. This results in a signal or signals appearing on line 44 which signals are applied to the second input to AND gate 134. Output line 136 from AND gate 134 is applied as the conditioning input to gate 138. The information input to gate 138 is the beforementioned output line 114 from write-one generator 116. Therefore, when gate 138 is conditioned, a signal of appropriate magnitude and duration to record a one bit on drum 30 is applied through gate 138, line 140, OR gate 128 and line 130 to cause a one bit to be recorded on the queue track of drum 30. Thus, for each device for which a stored message is intended, a bit is recorded in a corresponding position on the queue track of drum 30. The manner in which this information is utilized has already been described.

As will be described shortly, the response to a polling message may indicate to processor 20 whether any device which was previously in the process of having a message transmitted to it has now completed the transfer and is available to receive a new message. When the processor receives such a message, it applies the address of the device to address register 24 and applies a signal through line 142 to one input of AND gate 144. The second input to AND gate 144 is the before mentioned line 44 which will have a signal on it when the information for the appropriate device is being written into on drum 30. Output line 146 from AND gate 144 is connected as the conditioning input to gate 148. The information input to gate 148 is the before mentioned output line 122 from write-ZERO generator 124. Therefore, when gate 148 is conditioned, a signal of appropriate magnitude and duration to erase a bit recorded on drum 30 is applied through gate 148, line 150, OR gate 120 and line 121 to erase a bit stored on the use track of drum 30. The bit recorded on the use track of drum 30 is in this manner erased when the corresponding device is no longer busy.

When processor 20 receives an indication on line 98 that the message being investigated may be transmitted, it initiates a transmission, a bit at the time, through line 152, processor I/O interface 154 (FIG. 2B), high speed transmission line 12, I/O interface 156 at each of the MCU's 14 served by the line 12, and line 158 to the information input of gate 160. From this point on the description of the operation will be written with respect to a single MCU. However, it is to be understood that what is occurring at the MCU being described will, in most instances, also be occurring at the other MCU's connected to the line 12. The MCU has a first bit clock 162 which operates at the same rate as the line 12. Clock 162 is therefore generating an output signal on line 164 once for each bit applied to the information input of gate 160. The signal on line 164 is applied as the conditioning input to gate 160 and is also applied as a shift input to input regsiter 166. Output line 168 from gate 160 is the information input to input register 166. Therefore, as bits are received on line 12, they are sequentially passed into input register 166.

Figure 3:
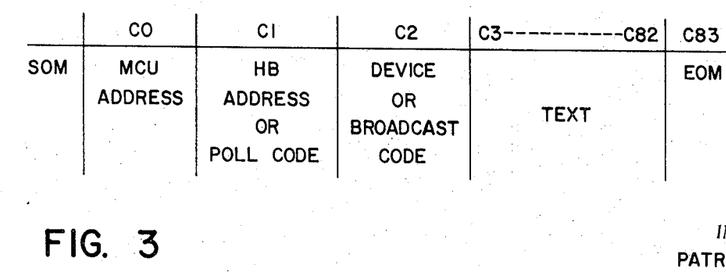
FIG. 3 is a diagram illustrating the message format for the system of the preferred embodiment of the invention.

The contents of register 165 are continuously applied to lines 168 which lines are selectively connected to the inputs of start-of-message (SOM) decode AND gate 170. Referring now to FIG. 3 it is seen that each message commences with a start-of-message character. This is a unique bit combination which cannot be duplicated by any randomly occurring bit combination in the system. In the alternative, a start-of-message may be indicated by two or three consecutive sync pulses or in some other manner. The lines 168 are connected to the inputs of gate 170 in a manner such that, when the start-of-message code is in input register 166, gate 170 generates an output signal on line 172 which is applied through OR gate 174 and line 176 to reset character counter 178 to a count of zero. Output line 164 from bit clock 162 is connected as the step input to bit line counter 180. Counter 180 is stepped until it reaches a count equal to the number of bits in a character. The next step input on line 164 results in an output signal on character line 182 and resets the bit line counter to a count zero. The signal on line 182 is applied to step character counter 178.

From FIG. 3 it is seen that the C0 character, the first character following the start-of-message character, is the MCU address character. Character counter 178 is of a type which generates an output only when a change occurs in the count therein. Thus, when the count is stepped from C0 to C1, a signal appears on the C0 output line which signal is applied as one input to AND gates 184 and 186. At this point it should be mentioned that no attempt has been made to connect the C0–C84 output lines from counter 178 to the various points in the circuit where they are utilized. Instead at each of these points a line appears with the appropriate clock pulse designation. The remaining inputs to AND gates 184 and 186 are selected ones of the output lines 168 from input register 166. AND gate 184 generates an output signal on line 188 if, at C0 time, input register 166 contains the code for the particular MCU. AND gate 186 generates an output of signals on line 190 if, at C0 time, input register 166 contains the universal MCU code. Lines 188 and 190 are connected as the inputs to OR gate 192. There is therefore a signal on output line 194 from OR gate 192 if the particular MCU is to receive the message appearing on line 12. Line 194 is connected to set MCU flip-flop 196 to its ONE state.

Referring again to FIG. 3, it is seen that the end-of-message character is character 83. Therefore, selected ones of the lines 168 and the C83 clock line are the inputs to end-of-message decode AND gate 198. Output line 200 from gate 198 is connected to reset MCU flip-flop 196 to its ZERO state. The MCU flip-flop therefore stays in its ONE state from the time that a decision is made that a message is to be stored in a given MCU until an end-of-message indication is received.

Output line 202 from the ONE-side of MCU flip-flop 196 is connected as ONE input to AND gate 204. The second input to AND gate 204 is character clock output line 182 from bit-line counter 180. AND gate 204 is therefore fully conditioned at the end of each character during the time that MCU flip-flop 196 is in its ONE state. Output line 206 from AND gate 204 is connected as the conditioning input to gate 208. The information input lines to gate 208 are output lines 168 from input register 166.

Figure 2B:
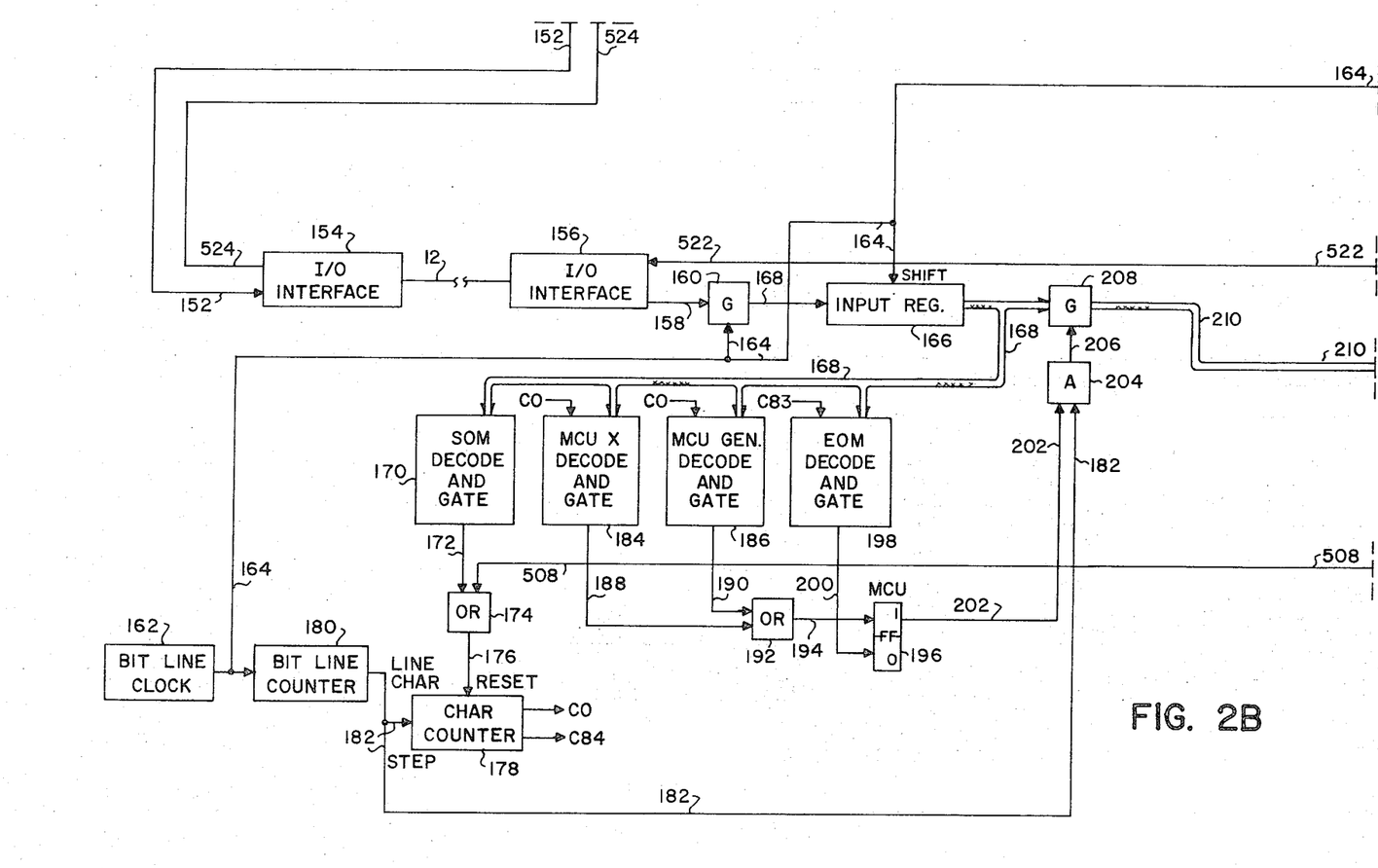
Figure 2C:
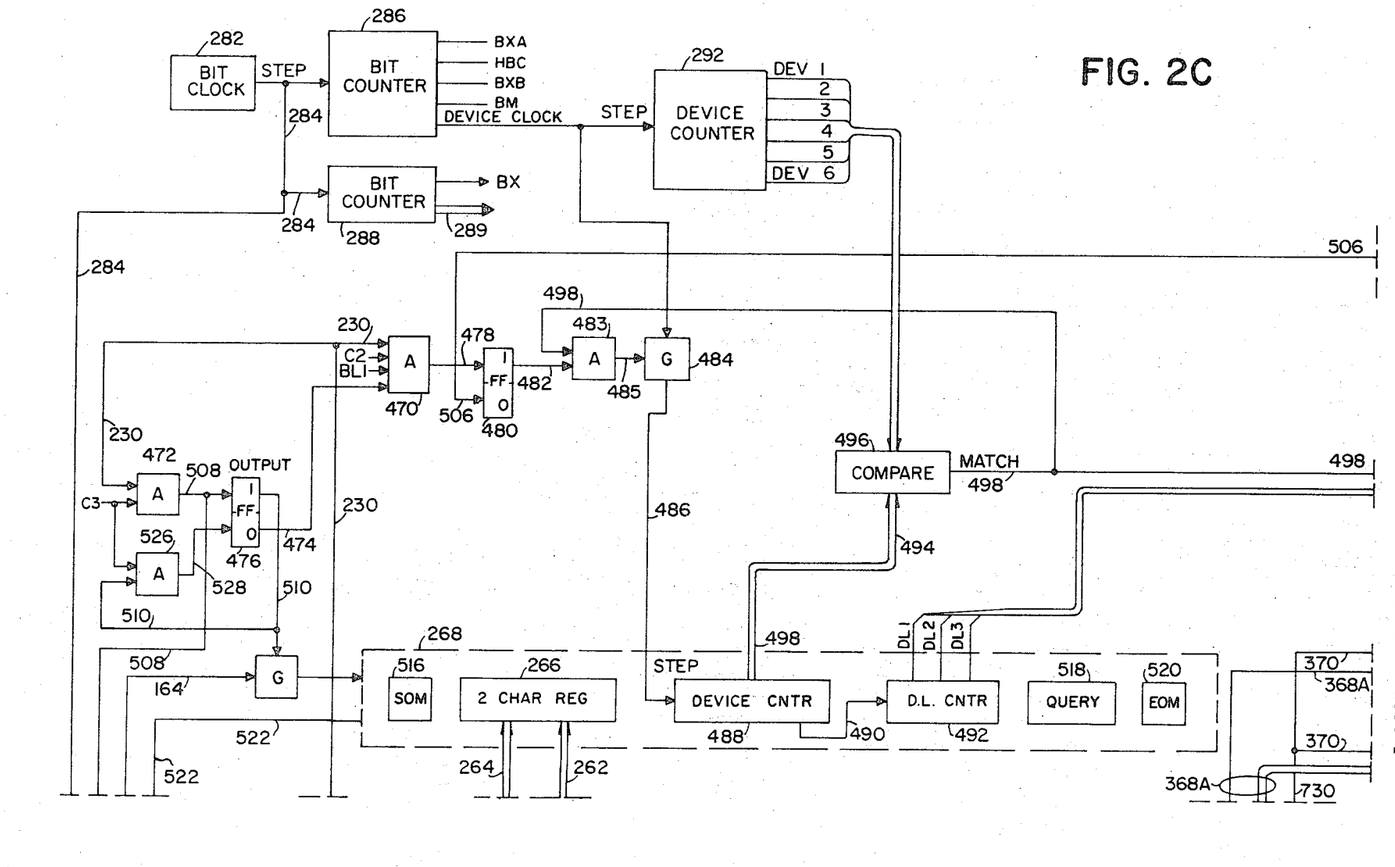
Figure 2D:
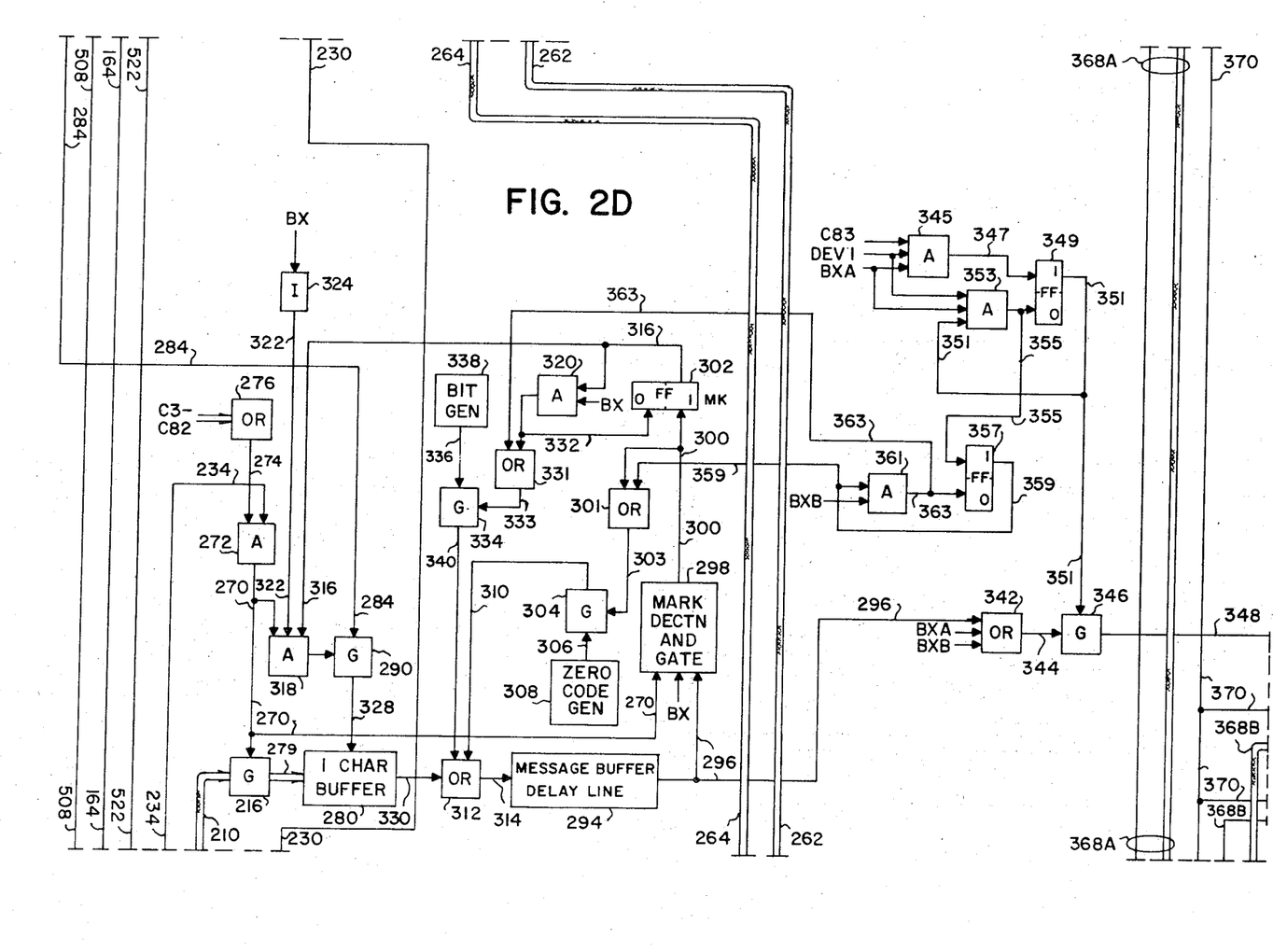

Output lines 210 from gates 208 are connected as the information inputs to gates 212 (FIG. 2E), 214, and 216 (FIG. 2D). At the end of character 1 time, a signal is applied to condition gate 212 to pass the message character 1 stored in input register 166 through lines 218 to be stored in one character buffer 220. Referring now to FIG. 3 it is seen that the C1 character is either a half-buffer (HB) address or a poll code. Assume initially that the C1 character is a half-buffer address. A half buffer address is necessary because of the unique nature of the system being described. The message which is to be stored for each device associated with the MCU is stored in a segment of a delay line. Each segment of the delay line is capable of storing two complete messages. The half-buffer address indicates in which of the two message positions in the message storing segment the particular input message is to be stored.

The character in buffer 220 is applied through lines 222 to selected inputs of poll decode AND gate 224, half-buffer A (HBA) decode gate 226 and half-buffer B (HBB) decode AND gate 228. A signal appears on output line 230 from poll decode AND gate 224 if the code for a poll message is stored in buffer 220. Line 230 is connected through inverter 232 to line 234. A signal therefore appears on line 234 if a poll code is not in buffer 220. The manner in which the signal on line 234 is utilized will be described shortly.

Output HBA output line 236 from AND gate 226 is connected as one input to AND gates 238 and 240 while HBB output line 242 from AND gate 228 is connected as one input to AND gates 244 and 246. The manner in which these four AND gates are utilized to control the loading of information into the memory of the MCU will be described shortly.

Gate 214 (FIG. 2E) is conditioned to pass a character through lines 248 to be stored in one character buffer 250 at the end of character 2 time. Referring to FIG. 3, it is seen that character 2 contains the device or broadcast code. It is therefore the device or broadcast code which is stored in buffer 250. Output line 252 from buffer 250 are connected as the information inputs to gates 254 and as the inputs to three decoders 256A–256C. Decoders 256A–256C each have six output lines 368A–368C respectively. The lines are individually designated the device 1–device 6 output lines respectively. Depending on the code stored in buffer 250, signals will appear on one or more of the 18 output lines from the decoders 256. The reason why three separate decoders have been shown rather than a single decoder is because the memory in each MCU is divided into three portions. The three decoders, however, combine to perform the single function of determining the devices for which the message applied to the MCU is intended.

The conditioning input to gate 254 is the before mentioned line 234 indicating that a poll message has not been applied to the system. Line 234 is also applied as the conditioning input to gates 258, the information inputs to which are the output lines 222 from buffer 220. Output lines 262 and 264, respectively, from gates 254 and 258 are connected as the inputs to two-character register 266 (FIG. 2C) in output register 268. As will be seen later, these characters are utilized, in response to a poll message, to inform the processor that the message applied to the MCU has been properly received.

Referring now to FIG. 2D, it is seen that the conditioning input to gate 216 is output line 270 from AND 272. One input to AND gate 272 is no-poll-message line 234. The other input to AND gate 272 is output line 274 from OR gate 276. The inputs to OR gate 276 are the C3–C82 output lines from character counter 178 (FIG. 2B). Referring to FIG. 3 it is seen that the C3–C82 characters of a message are the text characters which it is desired to transmit to the remote message receiving device 18. Gate 216 is therefore conditioned when a complete text character of a non-poll-message has been assembled in input register 166. The characters passed by gate 216 are applied through lines 278 to be stored in one-character buffer 280.

At this point some mention should be made of the storage elements utilized at the MCU's. In the preferred embodiment of the invention these memory devices are recirculating delay lines the recirculation rate of which is many times greater than the rate at which characters are applied to the MCU through lines 12. Referring now to FIG. 2C a second bit clock 282 is provided which clock operates at the frequency of the delay line memories utilized in the MCU. This clock operates at a rate many times greater than that of bit line clock 162 (FIG. 2B). Output line 284 from bit clock 282 is connected to step bit counter 286, to step bit counter 288, and as the information input to gate 290 (FIG. 2D). Bit counter 286 operates in synchronism with the delay line memories and is utilized to indicate the bit position in the section of the memory which is being read or written at any given time. Bits which are of particular interest are the BXA bit which is the first bit in the segment of the memory for a given device, the HBC bit which is the last bit at the end of the first message of a segment of the memory assigned to a given device, the BXB bit which is the first bit of the second message in the segment for a given device, the BM bit which is the next to the last bit in the segment for a given device and a device clock bit which is the last bit in the segment for a given device. As with other clock bits, no attempt will be made to connect the clock output lines to the various points in the circuits where they appear. Bit counter 288 is also synchronized with the circulation of the MCU memory but has a capacity of only one character. The particular output bit of interest from this counter is the BX bit which is the first bit of each character. The outputs from all positions of counter 288 appear on line 289. The device clock output line from bit counter 286, in addition to other functions to be mentioned shortly, is also connected as the step input to device counter 292. The DEV1–DEV6 output lines from device counter 292 indicate the particular device segment in the MCU memory delay lines which is being read from or written into at any given time.

Referring now to FIG. 2D, it is seen that each MCU contains a message buffer delay line 294. The first bit position, the BX position, of each character in this delay line is reserved as a marker bit position. This bit will initially be stored at the beginning of the first character position, or, in other words, in the character position at which the C3 character is to be stored. Output line 296 from delay line 294 is connected as one input to mark-detection AND gate 298. A second input to this AND gate is the BX clock pulse and a final input to this AND gate is output line 270 from AND gate 272. Therefore, when a mark bit is detected in the clock bit position of a character in buffer 294 and the character applied to the system is a C3–C82 character of a message which is not a poll message, mark-detection AND gate 298 is fully conditioned to generate an output signal on line 300 which signal is applied to set mark flip-flop 302 to its ONE state and through OR gate 301 and line 303 as a conditioning input to gate 304. The information input to gate 304 is output line 306 from ZERO code generator 308. Therefore, when a mark bit is detected under the condition indicated, a ZERO code is applied through output line 310 of gate 304, OR gate 312 and line 314 to be recorded in delay line 294. This effectively erases the marker bit which was just detected. Mark flip-flop 302 being in its ONE state results in a signal on ONE-side output line 316 which is applied as ONE input to AND gates 318 and 320. The other inputs to AND gate 318 are the before mentioned output line 270 from AND gate 272 and output line 322 from inverter 324. The input to inverter 324 is the BX clock line. AND gate 318 is therefore fully conditioned when the mark flip-flop in its ONE state, a character 3–82 of a mesage which is not a poll message has just been applied to the system, and the BX bit is not being written into delay line 294. Output line 326 from AND gate 318 is applied as the conditioning input to gate 290. When gate 290 is conditioned, bit-clock pulses on line 284 are applied through line 328 to step one-character buffer 280. This results in the character in buffer 280 being shifted out through line 330, OR gate 312 and line 314 to be recorded in succeeding bit positions in delay line 294 in the character position where the mark bit was detected.

When the BX bit, the first bit of the next character, is reached, an input is applied to inverter 324 deconditioning AND gate 318 to stop the stepping of buffer 280, and a signal is applied to fully condition AND gate 320 to generate an output signal on line 332 which signal is applied to reset mark flip-flop 302 to its ZERO state and is also applied through OR gate 331 and line 333 to condition gate 334. The information input to gate 334 is output line 336 from bit generator 338. Therefore, when gate 334 is conditioned, a signal of appropriate magnitude and duration to record a bit in delay line 294 is applied through line 340, OR gate 312 and line 314 to cause a bit to be recorded in the BX position of the next character in the delay line 294. It is thus seen that each time a character is shifted into buffer 280, it is stored in the character position in delay line 294 which has a mark bit recorded in its first character position and the mark bit is advanced to the beginning of the next character position. This assures that succeeding characters applied to the system are stored in succeeding character positions in delay line 294. When a character is stored in the C82 position, the mark bit is advanced to the C83 character position. The manner in which the bit is utilized will be described later.

Figure 2E:
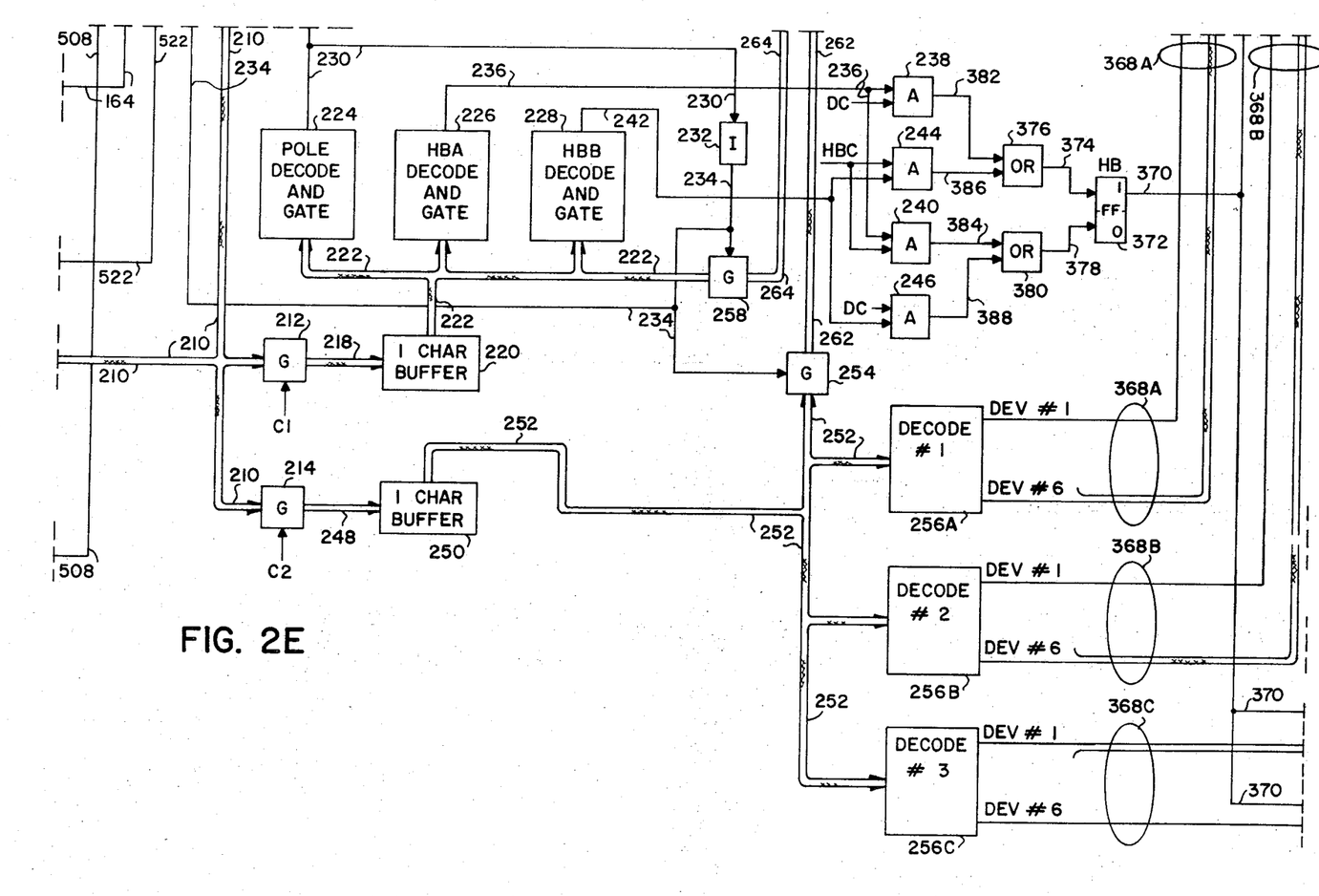
Figure 2F:
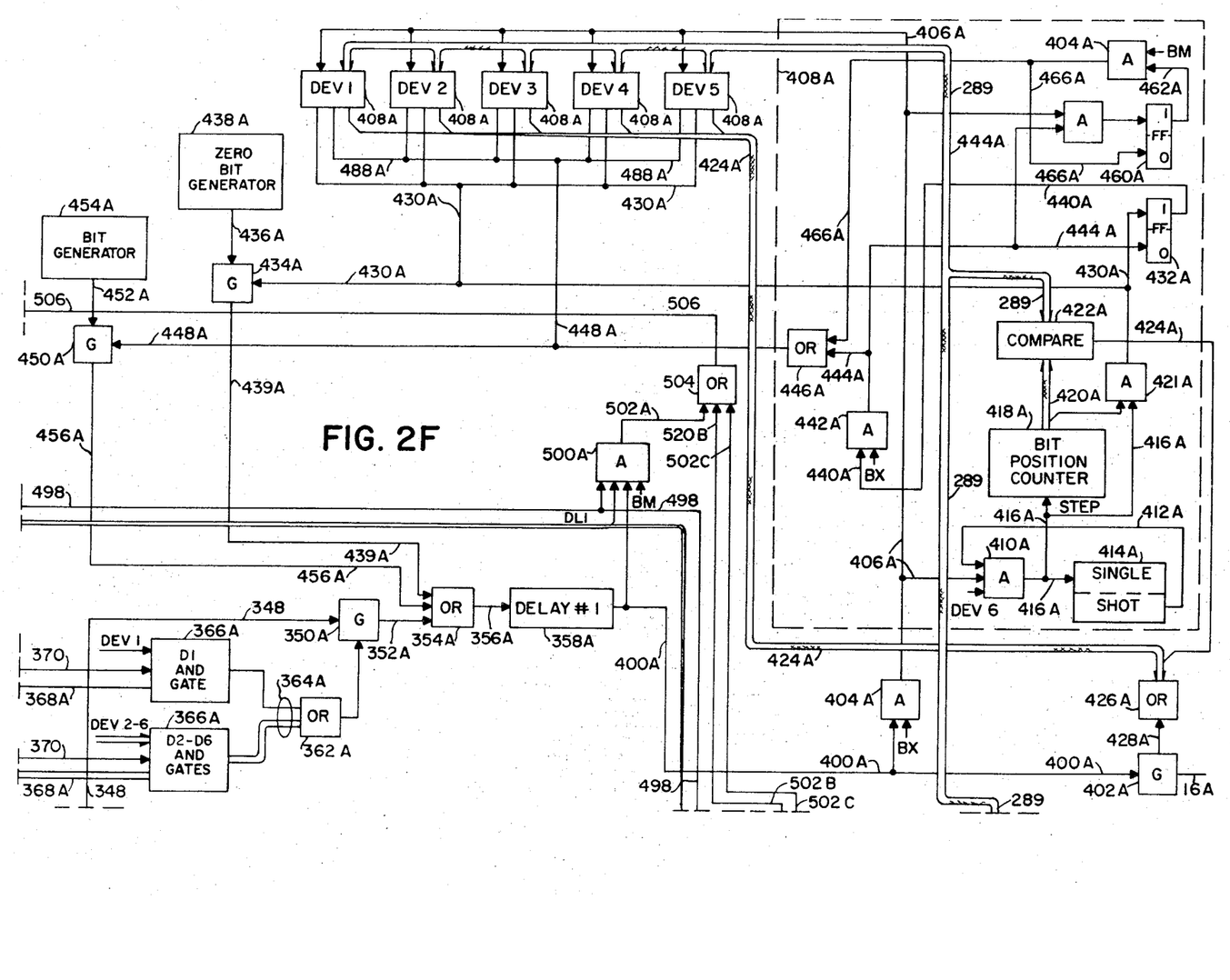
Figure 2G:
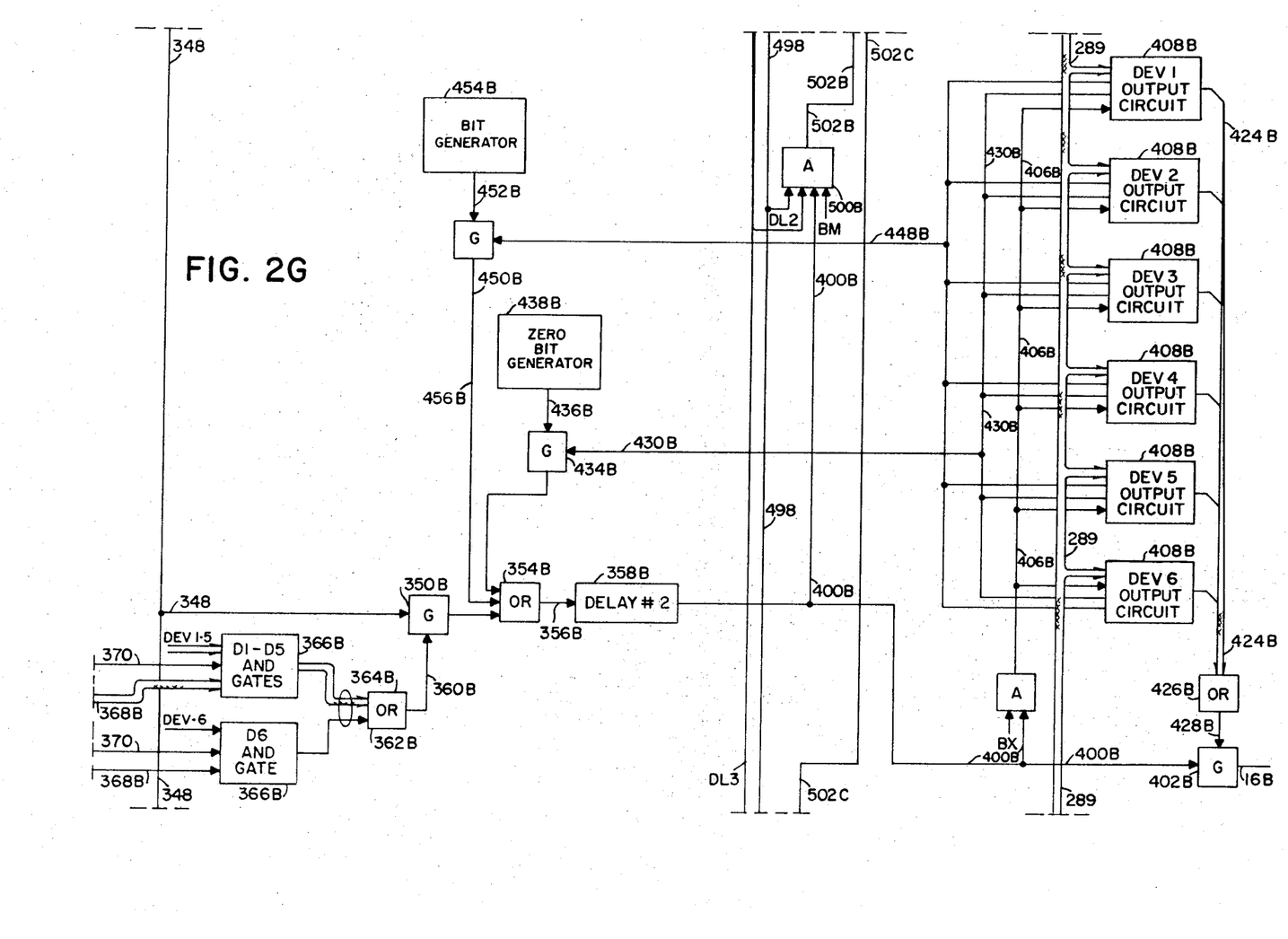
Figure 2H:
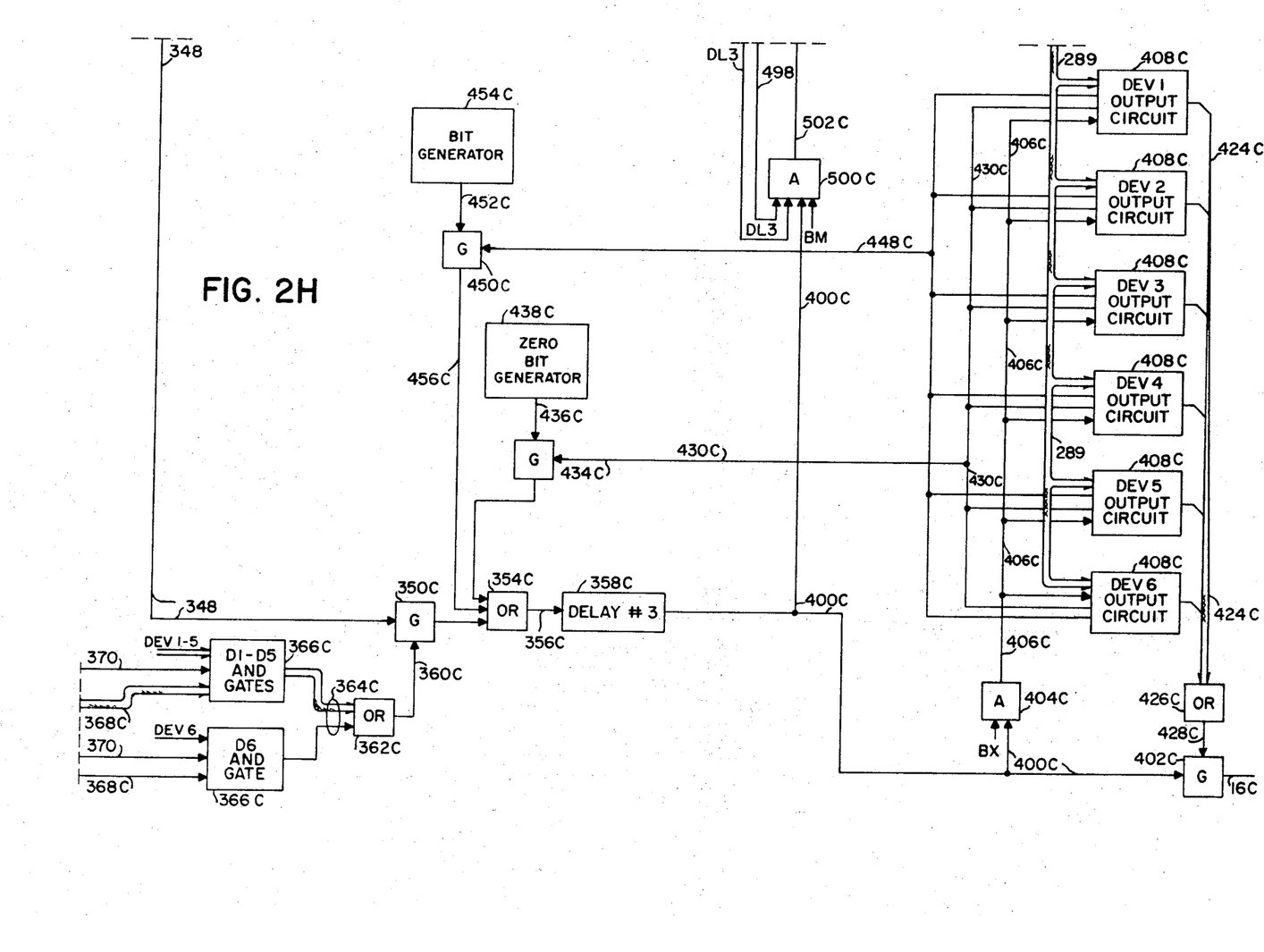

When the transfer of a message into message-buffer delay line 294 has been completed, the system is ready to store the message in segments of the MCU memory corresponding to the device or devices which are to receive the message. The outputs from buffer 294 on line 296 are applied through OR gate 342 and line 344 to the information input of gate 346. At the first character time after the loading of buffer 294 has been completed, a signal appears on the C83 output line from character counter 178 which signal is applied as one input to AND gate 345. The other two inputs to AND gate 345 are a DEVI clock signal from device counter 292 and a BXA clock signal from bit counter 286. AND gate 345 is therefore fully conditioned to generate an output signal on line 347 during the first bit time of the device 1 segment of an MCU memory delay line following the appearance of a signal on the C83 line. The signal on line 347 is applied to set flip-flop 349 to its ONE state. ONE-side output line 351 from flip-flop 349 is applied as the conditioning input to gate 346 and as one input to AND gate 353. The other inputs to AND gate 353 are the DEVI clock line and the BXA clock line. Output line 355 from AND gate 353 is connected to reset flip-flop 349 to its ZERO state. Flip-flop 349 is therefore in its ONE state, applying a conditioning signal to gate 346, for one complete revolution of an MCU memory delay line. Gate 346 being conditioned permits the message stored in buffer 294 to be applied through line 348 to the information inputs of gates 350A–350C (FIGS. 2F–2H, respectively). As will be seen shortly, the message in buffer 294 is applied to these gates twelve times and may be stored in up to six half buffer areas in the memory delay line.

The signal on output line 355 from AND gate 353 is also applied to set flip-flop 357 to its ONE state. Flip-flop 357 is therefore set to its ONE state at the beginning of the first buffer area of a device segment after the transfer of information from buffer 294 to the MCU memory delay lines has been completed. Output line 359 from the ONE-side of flip-flop 357 is connected as the other input to OR gate 301. Line 359 is also connected as one input to AND gate 361. The other input to AND gate 361 is the BXB clock line. AND gate 361 is therefore fully conditioned one complete message time after flip-flop 357 is set (the flip-flop was set by a BXA clock and is reset by the next following BXB clock). Output line 363 from AND gate 361 is connected as a ZERO-side input to flip-flop 357 and has the other input to OR GATE 331. A signal being applied to OR gate 301 while flip-flop 357 is in its ONE state causes ZERO bits to be recorded in buffer 294 for an entire message or, in other words, results in the message in buffer 294 being erased. The signal applied to OR gate 331 at BXB clock time after the erasing of the message in buffer 294 has been completed results in a bit mark being recorded in the bit mark position of the first charatcer in buffer 294, thus setting the buffer in preparation for the receiving of the next message.

The output line 352 from each gate 350 is applied through an OR gate 354 and line 356 as the input to a delay line memory 358. The bit rate in each of the delay lines 358 is the same as that in delay line buffer 294. However, each delay line 358 has a capacity for storing 12 messages. Stated another way, each delay line is divided into six device segments each of the segments being divided into half buffer areas each capable of storing a single message. The recirculation rate of delay line 294 is therefore twelve times that of each of the delay lines 358. This is the reason that the message in buffer 194 must be applied to gates 350 twelve times in order to permit the message to be stored in any half-buffer message storing area. Delay lines 358 are the message storing elements of the MCU. Three delay lines, each serving six devices, have been provided rather than a single delay line servicing eighteen devices in order to improve the response time and operating speed of the system.

In operation the message stored in delay line 294 is applied to line 348 in synchronism with the passage of each half-buffer area of each device segment passed its delay line read-write area. The message may therefore be written into any desired half-buffer area of a delay line 258A–258C. The segment or segments in which the message is actually recorded depends on the time at which the gates 350C–350C are conditioned. The conditioning input to each of the gates 350 is the output line 360 from the corresponding OR gate 362. The inputs to each OR gate 362 are the output lines 364 from a plurality of AND gates 366. Only the AND gate 366 corresponding to one device in each of the three groups has been shown in detail, with all of its inputs, in FIGS. 2G and 2H with the remaining five AND gates being shown as grouped together in a single box. The reason for this is that the inputs to each of the AND gates are substantially the same. From FIGS. 2G and 2H it is seen that the inputs to each AND gate 266 are the device clock output line for the indicated device from device counter 292, the device decode output line 268 for a particular device from the corresponding decoder 256 (FIG. 2E) and output line 370 from the ONE-side of half-buffer flip-flop 372 (FIG. 2E). Half-buffer flip-flop 372 is set by a signal on output line 374 from OR gate 376 and is reset by a signal on output line 378 from OR gate 380. As was indicated previously, half-buffer A line 236 is connected as one input to AND gates 238 and 240. The second input to AND gate 238 is the device clock output line from bit counter 286, and the second input to AND gate 240 is the HBC clock line from this counter. Output line 382 from AND gate 238 is connected as one of the inputs to OR gate 376 while output line 384 from AND gate 240 is connected as one of the inputs to OR gate 380. It is therefore seen that when there is a signal on HBA line 236, the half-buffer flip-flop is set to its ONE state at the end of the last bit of the second half-buffer area of a delay line segment and is reset to its ZERO state at the end of the last bit of the first half-buffer area. The half-buffer flip-flop is therefore in its ONE state, generating an output signal on line 370 while the first half-buffer area for a device segment of the delay line 358 is in a position to be written into. Half-buffer B (HBB) line 242 is connected as one input to AND gates 244 and 246. The second input to AND gate 244 is the HBC clock line while the second input to AND gate 246 is the device clock (DC) clock line. Output line 386 from AND gate 244 is connected as a second input to OR gate 376 while output line 388 from AND gate 246 is connected as the second input to OR gate 380. It is therefore seen that when there is a signal on HBB line 242, half-buffer flip-flop 372 is set at the end of the last bit of the first half-buffer area of a given device segment and is reset at the end of the last bit of the second half-buffer area. It is thus seen that the half-buffer flip-flop is in its ONE state when the half-buffer area indicated by the character stored in buffer 220 is in a position to be written into in the delay lines 358.

From the above it is seen that when the half-buffer area indicated by the chaarcters stored in buffer 220 of a device segment for a device which the message stored in buffer 294 is to be transmitted to is in a position to be recorded in, this being indicated by the correspondence of a signal on an output line 368 from a decoder 256 and a signal on a device decode output line from device counter 292, an AND gate 366 is fully conditioned to generate an output signal on a line 364 which signal is applied through an OR gate 362 and a line 360 to condition the appropriate gate 350 to pass the message signals through OR gate 354 and line 356 to be recorded in the delay line. An AND gate 366 in two or more of the groups, as for example an AND gate 366A and an AND gate 366C, may be conditioned at the same time permitting the message in buffer 294 to be stored in two device segments in different delay lines 358 simultaneously. At succeeding device times, successive ones of the AND gates 366 in a given group may also be fully conditioned. It is therefore apparent that the message in buffer 294 may be stored in only one device segment in any one or more of the delay lines 358 or in any desired combination of these device segments. Since, as will be seen shortly, the device segments in which a message is stored control the devices 18 to which the message is ultimately transmitted, the desired flexibility in the remote devices to which the message may be transmitted is in this manner achieved.

It should at this point be mentioned that OR gate 342 (FIG. 2D) also has as inputs clock output lines BXA and BXB from bit counter 286. This means that the half-buffer area which is written into will have a bit recorded in its first bit position or, stated another way, in the marker bit position of its first character. The manner in which this bit is utilized will be described shortly.

The manner in which a message to be transmitted to one or more remote devices 18 (FIG. 1) is stored in the delay lines 358 has just been described. The manner in which the message is read out from delay lines 358 to be transmitted to the remote devices will now be described. Since the reading out from each of the three delay lines 358 is substantially the same, the following discussion will be with respect to the reading out of a message from delay line 358A (FIG. 2F) only, it being understood that what is said with respect to the reading out from this delay line will apply equally to the reading out of the other two delay lines as well.

Output line 400A from delay line 358A is connected as the information input to gate 402A and as one input to AND gate 404A. A second input to AND gate 404A is the BX clock signal. AND gate 404A is therefore fully conditioned when a marker bit appears in the marker bit position of a character stored in delay line 358A. When this occurs AND gate 404A generates an output signal on line 406A which is applied as one of the inputs to each of the device output circuits 408A. Since the output circuits 408A each contain identical circuitry, differing only in the device clocks which are utilized, only one of these circuits has been shown in detail in FIG. 2F. Device output circuits 408B and 408C are identical to the device output circuit 408A which is shown and therefore have likewise not been shown in detail.

Referring now to the detailed device output circuit 408A shown in FIG. 2F, it is seen that the signal on line 406A is applied as an input to AND gates 410A and 412A. A second input to AND gate 410A is the DEV1 clock line from device counter 292 (FIG. 2C). The clock line input to AND gate 410 in each of the output control circuits will depend on the device which the control circuit is associated with. The final input to AND gate 410A is output line 412A from the ZERO-side of single-shot 414A. Output line 416A from AND gate 410A is connected to set single-shot 414A to its ONE state to step bit position counter 418A and as one input to AND gate 420A. The duration of single-shot 414A is such that it remains in its ONE state long enough for a bit to be transmitted through the low-speed line 16A to the intended device. Single-shot 414A may, therefore, remain on for several cycles of delay line 358A.

Bit position counter 418A has a capacity equal to the number of bits in a character and will, as will be seen shortly, initially be set to a bit one count (bit one being the BX or marker bit). Therefore, the first time that a marker bit is detected after single-shot 414A for device 1 has returned to its ZERO state a signal will appear on line 416A setting the single-shot to its ONE state and stepping the count in counter 418A to a bit count of 2 (to the bit position of the first information bit of the character). Since the marker bit was initially inserted at the beginning of the first character of the message applied to delay line 358A, this is the character position in which the marker bit will first be detected.

Output lines 420A from counter 418A are connected as one set of inputs to compare circuit 422A. The other set of inputs to this compare circuit are the before mentioned output lines 289 from bit counter 288 (FIG. 2C). Compare circuit 422A is therefore conditioned to generate a match output signal on line 424A when the bit count in counter 288 is equal to the count in bit position counter 418A or, in other words, when the bit indicated by counter 418A is in a position to be read out from delay line 358A. The signal on line 424A is applied through OR gate 426A and line 428A as the conditioning input to gate 402A. The desired bit is thus gated onto circuit output line 16A.

Nothing further happens until single-shot 414A times out and returns to its ZERO state. As indicated previously, this will occur a sufficient period of times after the bit was applied to line 16A to permit the remote device for which the bit is intended to accept it. The time at which a bit appears on line 16A assures that the bit is routed to the proper device.

The first time that a marker bit is detected during device one time after single-shot 414A times out, AND gate 410A is again fully conditioned to set the single-shot to its ONE state and to apply a step input to bit position counter 418A. The bit counter is thus stepped to a bit 3 count. A successful comparison in compare circuit 422A therefore occurs on the bit following the bit on which a successful comparison previously occurred thus conditioning gate 402A to pass this bit through line 16A to device 1.

The sequence of events described above continues until the gating out of all bits of the character containing the marker bit has been completed. As the last character is gated out, a signal appears on the last of the lines 420A. This signal is applied as the second input to AND gate 421A. The next time that AND gate 410A is fully conditioned to generate an output signal on line 416A the bit counter is stepped to a count of one and AND gate 421A is fully conditioned to generate an output signal on line 430A which signal is applied to set flip-flop 432A to its ONE state and as the conditioning input to gate 434A. The information input to gate 434A is output line 436A from ZERO bit generator 438A. Therefore, when a signal appears on line 430A a ZERO bit is applied through line 439A, OR gate 354A and line 356A to be recorded in delay line 358A. This effectively erases the marker bit for the character which was just read out. ONE-side output line 440A from flip-flop 432A is connected as one input to AND gate 442A. The second input to AND gate 442A is the BX clock line. Therefore, when the marker bit position of the character following that which was just read out is reached, AND gate 442A is fully conditioned to generate an output signal on line 444A which signal is applied to reset flip-flop 432A to its ZERO state and through OR gate 446A and line 448A to the conditioning input of gate 450A. The information input to gate 450A is output line 452A from bit generator 454A. Therefore, when a signal appears on line 448A, a bit signal is applied through line 456A OR gate 354A and line 356A to be recorded in delay line 358A. A bit is thus recorded in marker bit position of the character following the character which was just read out. The system is thus set to read out the second character of the message. The second and succeeding characters of the message are read out to remote device one in a manner identical to that described above for the first character, with the marker bit being advanced to the marker bit position of the succeeding character after each character is read out.

Since a marker bit was written into the first character position of a message stored in delay line 358A and a marker bit appears at the beginning of the character following the last character of the message as a result of the read-out from buffer delay line 294, these are the only two characters in which marker bits initially appear. Therefore, AND gate 412A will not be fully conditioned until after the last character in the message has been read out and an attempt is made to record the marker bit in the marker bit position of the next character. At this time AND gate 412A is fully conditioned to generate an output signal on line 458A which signal is applied to set flip-flop 460A to its ONE state. The resulting output signal on ONE-side output line 462A from flip-flop 460A is applied as one input to AND gate 464A. The other input to AND gate 464A is bit mark clock from bit counter 286. It will be remembered that this clock appears at the bit position in which a device-free bit is to be recorded. Output line 466A from AND gate 464A is applied to reset flip-flop 460A to its ZERO state and is also applied through OR gate 416A and line 448A as a conditioning input to gate 450A. The conditioning of gate 450A permits a bit to be recorded in the BM position for the device which has just had a complete message recorded in it. A device-free indication is in this manner recorded in the delay line.

It should, at this point, be noted that, while the previous discussion related to the reading out of a message for a single device 18, it is possible, since there is a separate device output circuit 408 for each device, to transmit messages to all of the devices concurrently.

Immediately after the sending of each message to an MCU, and periodically at other times, processor 20 (FIG. 2A) sends a polling message to the MCU. A polling message contains only a start-of-message (SOM) character, an MCU address in the C0 character position, a poll code in the C1 character position, and an end-of-message character in the C2 character position. The SOM and C0 characters of the poll message function in a manner identical to that previously described for an information message to cause MCU flip-flop 196 (FIG. 2B) to be set to its ONE state and to cause the loading of the C1 character, the poll code character, into one character buffer 220 (FIG. 2E). The detection of the poll code character in buffer 220 causes poll-code-decode AND gate 224 to be fully conditioned to generate an output signal on line 230 which signal is applied as one input to AND gates 470 (FIG. 2C) and 472. The other inputs to AND gate 470 are C2 clock line from character counter 178, bit-line-one clock line from bit-line counter 180, and ZERO-side output line 474 from output flip-flop 476. Therefore, when the output flip-flop is in its ZERO state, a signal appears on output line 478 from AND gate 470 at bit-one, character-two time of a poll message. The signal on line 478 is applied to set flip-flop 480 to its ONE state. Flip-flop 480 being in its ONE state results in a signal on ONE-side output line 482 which is applied through AND gaate 483 and line 485 to condition gate 484 to pass the device clock pulses from bit counter 286 through line 486 to step device counter 488 in output register 268. The other input to AND gate 483 will be discussed shortly. When device counter 488 is incremented from a count of six to a count of zero, a signal appears on output line 490 which signal is applied to step data-line counter 492 in output register 268. Counters 488 and 492 combined to define a single device 18 associated with the particular MCU.

The contents of device counter 488 are applied through lines 494 as one set of inputs to compare circuit 496. The other set of inputs to compare circuit 496 are the DEV1–DEV6 output lines from device counter 292. Therefore, when the device count in counter 488 is equal to the device being read from delay lines 358, compare circuit 496 generates an output signal on match-line 498 which signal is applied as the second input to AND gate 483 and as one input to each of the AND gates 500 (FIGS. 2F–2H). The application of the signal on line 498 as one of the inputs to AND gate 483 assures that the stepping of counters 292 and 488 will be in synchronism with each other. A second input to each of the AND gates 500A–500C is the delay line 1–delay line 3 output line respectively from delay line counter 492. The third input to each AND gate 500 is output line 400 from the corresponding delay line 358 and the final input to each of these AND gates is the bit mark clock (BM clock) from bit counter 286. An AND gate 500 is therefore fully conditioned to generate an output signal on its associated output line 502 when a bit mark is detected in the device segment for the device indicated in counter 488 in the delay line indicated in counter 492. If a bit mark is not detected in the position indicated by counters 488 and 492, counter 488 is incremented at the next device clock time, and the next device segment is looked at to determine if it contains a mark. When all the devices in the particular delay line have been looked at, the delay line counter is incremented and a scan is made of the devices in the next delay line. When a bit mark is detected in a device segment being looked at, a signal appears on the corresponding output line 502 from AND gate 500 which signal is applied through OR gate 504 and line 506 to reset flip-flop 480 (FIG. 2C) to its ZERO state. The resetting of flip-flop 480 to its ZERO state terminates the signal on line 482 thereby deconditioning gate 484. This results in the count in counters 488 and 492 being frozen at their existing count. The device at which the bit mark is detected is in this manner recorded. It should, at this point, be noted that when the next poll message is applied to the MCU, a search for a device having a bit mark will begin at the point of which the last search terminated.

Nothing further happens in response to the reception of a poll message until character counter 178 generates a C3 clock pulse. When a C3 clock pulse is generated by counter 178 a signal is applied to the second input of AND gate 472 (FIG. 2C) resulting in an output signal on line 508 which is applied to set output flip-flop 476 to its ONE state and is also applied through OR gate 174 (FIG. 2B) and line 176 to reset character counter 178 to a count of zero. Output flip-flop 476 being in its ONE state results in a signal on ONE-side output line 510 from this flip-flop which signal is applied as a conditioning input to gate 512. The information input to this gate is the bit-line clock output line 164. The conditioning of the gate 512 therefore permits bit-line clock pulses to be applied through line 514 to shift out the message contained in output register 268 a bit at a time. Output register 268 has a SOM character recorded in a one-character register 516 thereof which is read out during the C0 clock time, a two character MC and device or broadcast code in register 266 which is read out during C1 and C2 time and is recognized by processor 20 as a verification that a previously-sent message has been properly received, a device count and data line count in counters 488 and 492 which are recognized by the processor to indicate a device which is now available to receive messages (the manner in which this information is utilized at the processor has been previously described) a register 518 which may contain a query to the processor from one of the devices associated with the MCU, and a register 520 which contains an EOM character that is read out during clock time C83. The manner in which query register 518 is loaded and in which this information is utilized by the processor forms no part of the present invention and will not be described. Each bit of the output from output register 268 is applied through line 522, the MCR I/O interface 156 (FIG. 2B), line 12, processor I/O interface 154, and line 524 to the processor.

The signal on output line 510 from output flip-flop 476 (FIG. 2C), is also applied as one input to AND gate 526. The other input to AND gate 526 is the C84 clock line from character counter 178. Therefore, when character counter 178 has completed its cycle during the reading out of the contents of output register 268 AND gate 526 is fully conditioned to generate an output signal on line 528 which is applied to reset output flip-flop 476 to its ZERO state. The MCR is thus reset in preparation for the receiving of the next poll or information message.

A system for transmitting messages to any selected combination of remote devices from a single processor with the transmission of only a single message from the processor has just been described. It is apparent that new combinations of the 18 remote devices associated with an MCR may be accommodated merely by providing decoders 256 (FIG. 2E) with the capability of recognizing a new broadcast code. It is also apparent that the devices which are to receive a message having a particular broadcast code may be varied merely by varying the connections set up in the decoders 256. An extremely flexible system has therefore been provided which permits almost unlimited variations in the combination of devices which may receive a single input message.

While delay lines have been shown in FIGS. 2A–2H, it is apparent that other storage elements, such as for example drums or discs, might be utilized with suitable modifications in the circuitry employed. It is also apparent that the mix between general purpose and special purpose circuitry shown in FIG. 2A may be varied by other performing the functions entirely by programming a general purpose computer or by providing additional special purpose circuitry to perform the functions indicated for the processor 20. Drum 30 would, for example, in all likelihood not be a separate device but would merely be a few tracks on a larger memory utilized for other purposes as well. The particular algorithm employed to determine messages which are to be transmitted may also be varied as for example by providing priorities for broadcast messages over messages to a particular device. The message format shown in FIG. 3 may likewise be varied to some extent, particularly as to the number of characters.

While the invention has been particularly shown and described with reference to a preferred embodiment thereof, it will be understood by those skilled in the art that the foregoing and other changes in form and details may be made therein without departing from the spirit and scope of the invention.

What is claimed is:
1. A message transmitting system comprising
a central station adapted to generate messages, each of said messages including a destination code;
a control unit adapted to receive and store messages from said central station;
a plurality of message receiving devices operatively associated with said control unit;
means included as part of said control unit and responsive to the destination code in each message for selecting one or more of said devices; and
means included as part of said control unit for transmitting the message stored in said control unit to all of said selected devices.

2. A system of the type described in claim 1 wherein there are a plurality of said control units each of which has a plurality of remote devices operatively associated therewith;
wherein there is included as part of each message an indication of the control unit which the message is intended for;
and including means, included as a part of each control unit, responsive to said indicating means for storing at the control unit only messages which are intended for it.

3. A system of the type described in claim 2 wherein said indicating means may indicate all of said control units.

4. A system of the type described in claim 1 wherein said central station includes means for indicating whether a device for which a message is intended is available to receive messages, and means responsive to an indication that one or more of said devices is not available, for inhibiting the transmission of the message.

5. A system of the type described in claim 4 including:
means at said central station for sending polling messages to said control unit;
means at said control unit for indicating the availability of each device associated therewith to receive messages;
means at said control unit and responsive to a polling message for sending to said central station an availability indication from said availability indicating means; and
means at said central station for storing the indications sent thereto in said central station availability indicating means.

6. A system of the type described in claim 4 wherein said central station includes means for indicating that there is a message waiting to be sent to a given device; and
means responsive to said indicating means for inhibiting the transmission of a message intended for said given device.

7. A system of the type described in claim 1 wherein said selecting means includes a decoder to which said destination code is applied, said decoder having an output line corresponding to each of said devices and being operative in response to a destination code to generate an output signal on one or more of said output lines corresponding to the selected devices.

8. A system of the type described in claim 7 wherein said control unit includes memory means, said memory means having a segment corresponding to each of said devices; and
means responsive to the signals on the output line from said decoding means for storing a message in a segment of the memory means corresponding to each of said selected devices.

9. A system of the type described in claim 8 including means for reading out a message stored in a segment of said memory means a bit at a time to be transmitted to the device corresponding to said segment.

10. A system of the type described in claim 9 wherein said memory read out and transmitting means includes means for reading out from a plurality of said memory means segments concurrently, whereby a message applied to said control unit may be concurrently transmitted to a plurality of said remote devices.

11. A system of the type described in claim 9 including means for detecting that the transmission of a message stored in a segment of said memory means has been completed; and
means responsive to said detecting means for recording an indication that the device corresponding to the segment is available to receive messages.

12. A system of the type described in claim 8 wherein each segment in said memory means is divided into two half-buffer areas each of which has sufficient capacity to store a message;
wherein each of said messages includes a half-buffer indicating code; and
wherein said control unit includes means operative in response to the half-buffer code in a message for routing the message into the appropriate half-buffer area in the segment of said memory means corresponding to each of said selected devices.

13. A system of the type described in claim 8 wherein said memory means includes a plurality of delay lines each of which contains the segments corresponding to at least one of said devices; and
wherein said control unit includes a high speed delay line having a one message storage capacity;
means for storing the information in a message in said high speed delay line; and
means, including in part said selecting means for gating the message stored in said high speed delay line into the segments of said memory delay lines corresponding to said selected devices.

14. A system of the type described in claim 8 wherein each of said messages is made up of a plurality of characters; and     wherein said control unit includes buffer means for assembling the characters of a message applied to the control unit into a complete message; and means, including said selecting means, operative when a complete message has been assembled for transferring the complete message from said buffer means into the segments of said memory means corresponding to said selected devices.

References Cited
UNITED STATES PATENTS

| | | | |
|---|---|---|---|
| 3,427,588 | 2/1969 | Mauzey et al. | 340—147 |
| 3,462,739 | 8/1969 | Scantlin | 340—154 |

DONALD J. YUSKO, Primary Examiner

U.S. Cl. X.R.

178—3